United States Patent
Wenig et al.

(10) Patent No.: US 8,335,848 B2
(45) Date of Patent: *Dec. 18, 2012

(54) METHOD AND APPARATUS FOR MONITORING AND SYNCHRONIZING USER INTERFACE EVENTS WITH NETWORK DATA

(75) Inventors: Robert Wenig, San Francisco, CA (US);
John Dawes, San Francisco, CA (US);
John Berkley, San Francisco, CA (US);
Al Gettier, San Francisco, CA (US);
Kirk Saathoff, San Francisco, CA (US);
Wolf Herda, San Francisco, CA (US);
Paul Austin, San Francisco, CA (US);
Ted Knudsen, San Francisco, CA (US)

(73) Assignee: TeaLeaf Technology, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/337,905

(22) Filed: Dec. 27, 2011

(65) Prior Publication Data

US 2012/0102101 A1 Apr. 26, 2012

Related U.S. Application Data

(63) Continuation of application No. 11/616,616, filed on Dec. 27, 2006, now Pat. No. 8,127,000.

(60) Provisional application No. 60/806,443, filed on Jun. 30, 2006.

(51) Int. Cl.
*G06F 15/173* (2006.01)
(52) U.S. Cl. ...................................................... 709/224
(58) Field of Classification Search ............................ None
See application file for complete search history.

(56) References Cited

U.S. PATENT DOCUMENTS

| 5,463,547 | A | 10/1995 | Markowitz |
| 5,564,043 | A | 10/1996 | Siefert |
| 5,577,254 | A | 11/1996 | Gilbert |
| 5,699,526 | A | 12/1997 | Siefert |
| 5,715,314 | A | 2/1998 | Payne |
| 5,717,879 | A | 2/1998 | Moran et al. |
| 5,721,906 | A | 2/1998 | Siefert |
| 5,751,962 | A | 5/1998 | Fanshier et al. |

(Continued)

FOREIGN PATENT DOCUMENTS

CA 2656539 2/2008

(Continued)

OTHER PUBLICATIONS

Smith et al., "Automated Protocol Analysis," Human Computer Interaction, 8:101-145, 1993.

(Continued)

*Primary Examiner* — George C Neurauter
*Assistant Examiner* — Suraj Joshi
(74) *Attorney, Agent, or Firm* — Stolowitz Ford Cowger LLP

(57) ABSTRACT

Network data associated with a network session is captured at a first location. The network data includes, but is not limited to, web page data transmitted over a network between a web server and a user terminal. User interface events associated with the same network session are separately captured at a second user terminal location. The user interface events include, but are not limited to, user inputs for interacting with the web page data. Both the captured network data and the separately captured user interface events are then used for analyzing the network session.

23 Claims, 13 Drawing Sheets

U.S. PATENT DOCUMENTS

| | | |
|---|---|---|
| 5,774,552 A | 6/1998 | Grimmer |
| 5,781,735 A | 7/1998 | Southard |
| 5,809,250 A | 9/1998 | Kisor |
| 5,825,880 A | 10/1998 | Sudia |
| 5,832,458 A | 11/1998 | Jones |
| 5,832,496 A | 11/1998 | Anand et al. |
| 5,845,124 A | 12/1998 | Berman |
| 5,848,396 A | 12/1998 | Gerace |
| 5,848,412 A | 12/1998 | Rowland |
| 5,857,188 A | 1/1999 | Douglas |
| 5,867,578 A | 2/1999 | Brickell |
| 5,894,516 A | 4/1999 | Brandenburg |
| 5,903,652 A | 5/1999 | Mital |
| 5,905,868 A | 5/1999 | Baghai et al. |
| 5,909,492 A | 6/1999 | Payne |
| 5,930,786 A | 7/1999 | Carino, Jr. et al. |
| 5,933,601 A | 8/1999 | Fanshier et al. |
| 5,941,957 A | 8/1999 | Ingrassia, Jr. et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,991,791 A | 11/1999 | Siefert |
| 6,006,228 A | 12/1999 | McCollum et al. |
| 6,026,403 A | 2/2000 | Siefert |
| 6,035,332 A | 3/2000 | Ingrassia, Jr. et al. |
| 6,085,223 A | 7/2000 | Carino, Jr. et al. |
| 6,151,584 A | 11/2000 | Papierniak et al. |
| 6,151,601 A | 11/2000 | Papierniak et al. |
| 6,169,997 B1 | 1/2001 | Papierniak et al. |
| 6,182,097 B1 | 1/2001 | Hansen et al. |
| 6,253,203 B1 | 6/2001 | O'Flaherty et al. |
| 6,286,030 B1 | 9/2001 | Wenig |
| 6,286,046 B1 | 9/2001 | Bryant |
| 6,286,098 B1 | 9/2001 | Wenig |
| 6,295,550 B1 | 9/2001 | Choung et al. |
| 6,317,794 B1 | 11/2001 | Papierniak et al. |
| 6,334,110 B1 | 12/2001 | Walter et al. |
| 6,397,256 B1 | 5/2002 | Chan |
| 6,418,439 B1 | 7/2002 | Papierniak et al. |
| 6,480,855 B1 | 11/2002 | Siefert |
| 6,489,980 B1 | 12/2002 | Scott et al. |
| 6,502,096 B1 | 12/2002 | Siefert |
| 6,519,600 B1 | 2/2003 | Siefert |
| 6,651,072 B1 | 11/2003 | Carino, Jr. et al. |
| 6,658,453 B1 | 12/2003 | Dattatri |
| 6,671,687 B1 | 12/2003 | Pederson et al. |
| 6,714,931 B1 | 3/2004 | Papierniak et al. |
| 6,766,333 B1 | 7/2004 | Wu et al. |
| 6,850,975 B1 | 2/2005 | Danneels et al. |
| 7,260,837 B2 | 8/2007 | Abraham et al. |
| 7,272,639 B1 | 9/2007 | Levergood |
| 7,278,105 B1 | 10/2007 | Kitts |
| 7,580,996 B1 | 8/2009 | Allan |
| RE41,903 E | 10/2010 | Wenig |
| 8,042,055 B2 | 10/2011 | Wenig |
| 8,127,000 B2 | 2/2012 | Wenig |
| 8,219,531 B2 | 7/2012 | Eagan et al. |
| 2002/0049840 A1 | 4/2002 | Squire |
| 2002/0056091 A1 | 5/2002 | Bala |
| 2002/0070953 A1 | 6/2002 | Barg et al. |
| 2002/0083183 A1 | 6/2002 | Pujare et al. |
| 2003/0023715 A1 | 1/2003 | Reiner et al. |
| 2003/0145071 A1 | 7/2003 | Straut |
| 2003/0154289 A1 | 8/2003 | Williamson et al. |
| 2004/0019675 A1 | 1/2004 | Hebeler |
| 2004/0100507 A1 | 5/2004 | Hayner et al. |
| 2005/0021713 A1 | 1/2005 | Dugan et al. |
| 2005/0066037 A1 | 3/2005 | Song et al. |
| 2005/0071464 A1 | 3/2005 | Kuwata et al. |
| 2005/0188080 A1 | 8/2005 | Motsinger et al. |
| 2005/0246651 A1 | 11/2005 | Krzanowski |
| 2005/0278565 A1 | 12/2005 | Frattura et al. |
| 2006/0048214 A1 | 3/2006 | Pennington et al. |
| 2006/0075088 A1 | 4/2006 | Guo |
| 2006/0117055 A1 | 6/2006 | Doyle |
| 2006/0123340 A1 | 6/2006 | Bailey et al. |
| 2007/0106692 A1 | 5/2007 | Klein |
| 2007/0226314 A1 | 9/2007 | Eick |
| 2008/0005793 A1 | 1/2008 | Wenig et al. |
| 2008/0034036 A1 | 2/2008 | Takeshima et al. |
| 2008/0046562 A1 | 2/2008 | Butler |
| 2008/0052377 A1 | 2/2008 | Light |
| 2008/0184129 A1 | 7/2008 | Cancel et al. |
| 2008/0216094 A1 | 9/2008 | Anderson |
| 2008/0294974 A1 | 11/2008 | Nurmi et al. |
| 2009/0013347 A1 | 1/2009 | Ahanger |
| 2009/0019133 A1 | 1/2009 | Brimley |
| 2009/0037517 A1 | 2/2009 | Frei |
| 2009/0063968 A1 | 3/2009 | Wenig |
| 2009/0070869 A1 | 3/2009 | Fan et al. |
| 2009/0083714 A1 | 3/2009 | Kiciman et al. |
| 2009/0138554 A1 | 5/2009 | Longobard et al. |
| 2009/0228474 A1 | 9/2009 | Chiu et al. |
| 2009/0247193 A1 | 10/2009 | Kalavade |
| 2009/0254529 A1 | 10/2009 | Goldentouch |
| 2010/0042573 A1 | 2/2010 | Wenig |
| 2010/0058285 A1 | 3/2010 | Meijer |
| 2010/0070929 A1 | 3/2010 | Behl et al. |
| 2010/0251128 A1 | 9/2010 | Cordasco |
| 2011/0320880 A1 | 12/2011 | Wenig |

FOREIGN PATENT DOCUMENTS

| | | |
|---|---|---|
| CA | 2696884 | 3/2009 |
| EP | 0326283 | 8/1989 |
| EP | 0843449 | 5/1998 |
| EP | 1097428 | 6/2002 |
| EP | 07840244.3 | 2/2008 |
| EP | 08769998.9 | 3/2009 |
| GB | 2357680 | 6/2008 |
| WO | 9825372 | 6/1998 |
| WO | WO 98/26571 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |

OTHER PUBLICATIONS

Bishop, Matt et al., "A Model of Security Monitoring", Department of Mathematics and Computer Science, Dartmouth College, pp. 46-52.

Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999, pp. 337-355.

International Search Report for PCT/US08/65582; Date of Mailing Sep. 11, 2008.

International Search Report for PCT/US2007/071096; Date of mailing May 13, 2008.

Written Opinion of the International Searching Authority for PCT/US08/65582; Mailing date Sep. 11, 2008.

Written Opinion of the International Searching Authority for PCT/US07/71096; Mailing date May 13, 2008.

Stolowitz Ford Cowger Listing of Related Cases Dec. 22, 2011.

PCT Search Report for PCT/US2011/033813; Mailing Date Jul. 28, 2011.

Written Opinion of the International Searching Authority for PCT/US2011/033813; Mailing Date Jul. 28, 2011.

Stolowitz Ford Cowger LLP, Listing of Related Cases May 3, 2012.

Written Opinion of the International Searching Authority; PCT/US11/35410; Date of mailing Dec. 14, 2011.

International Search Report for PCT/US11/35410; Date of mailing Dec. 14, 2011.

Stolowitz Ford Cowger Listing of Related Cases Mar. 15, 2012.

International Search Report for PCT/US09/04654; Date of mailing Oct. 2, 2009.

Written Opinion of the International Searching Authority; PCT/US09/04654; Date of mailing Oct. 2, 2009.

Holloway, et al., "Cryptographic Initialization Test", IBM Technical Disclosure Bulletin, pp. 195-198, Feb. 1991.

Han et al., "Using Ajax for Desktop-;like Geospatial Web Application Development," Geoinformatics, 2009 17th International Conference on Aug. 12-14, 2009, <http://geobrain.laits.gmu.edu/geobrainhome/docs/GeOnAS_Ajax.pdf>.

International Search Report for PCT/US12/25971; Date of mailing May 31, 2012.

Written Opinion of the International Searching Authority for PCT/US12/25971; Date of mailing May 31, 2012.

Bishop, Matt et al., "A Model of Security Monitoring", Department of Mathematics and Computer Science, Dartmouth College, pp. 46-52. Dec. 1989.

Peter Brusilovsky et. al., "Adaptive and Intelligent Web-based Educational Systems," International Journal of Artificial Intelligence in Education, Apr. 1, 2003, pp. 159-172, XP55039152, The Netherlands Retrieved from the Internet: URL: http://www.sis.pitt.edu/~peterb/papers/AIWBES.pdf [retrieved on Sep. 25, 2012] p. 160-161.

Atterer R et al. : "Knowing the User's Every Move—User Activity Tracking for Website Usability Evaluation and Implicit Interaction," WWW '06 Procedings of the 15th World Wide Web, ACM, 10.1145/1135777.1135811 ISBN 978-1-5959-323-2.

Lubarsky, How to Delete Cookie Using Javascript, Aug. 19, 2007, http:web.archive.org/web/20070819123555/http://blogs.x2line.corn/al/articies/316.aspx.

100C

| | | |
|---|---|---|
| NAME 102A | SHOPPING CART 102D | QTY 102E |
| JOHN SMITH | OTTOMAN - SK29 | 1 |
| ADDRESS 102B | CREDIT CARD 102F | TYPE 102G |
| 1402 E. ALDER | 4111 5899 401 7777 — 104 | US EXPRESS |
| CITY/STATE 102C | BUY | |
| REDWOOD CITY, CA | [102H] | |

| | | |
|---|---|---|
| NAME 102A | SHOPPING CART 102D | QTY 102E |
| JOHN SMITH | | |
| ADDRESS 102B | CREDIT CARD 102F | TYPE 102G |
| 1402 E. ALDER | | |
| CITY/STATE 102C | BUY [102H] | ! PLEASE COMPLETE OR CORRECT THE FOLLOWING FIELDS >> PLEASE ENTER A VALID CREDIT CARD NUMBER — 106 |
| REDWOOD CITY, CA | | |

- 100E
- 102A NAME: JOHN SMITH
- 102B ADDRESS: 1402 E. ALDER
- 102C CITY/STATE: REDWOOD CITY, CA
- 102D SHOPPING CART
- 102E QTY
- 102F CREDIT CARD: 4111 5899 4001 7777
- 102G TYPE: US EXPRESS
- 102H BUY

FIG.4F

- 100F
- 102A NAME: JOHN SMITH
- 102B ADDRESS: 1402 E. ALDER
- 102C CITY/STATE: REDWOOD CITY, CA
- 102D SHOPPING CART
- 102E QTY
- 102F CREDIT CARD: 4111 5899 4001 7777
- 102G TYPE: US EXPRESS
- 102H BUY
- 108: ! PLEASE COMPLETE OR CORRECT THE FOLLOWING FIELDS >> PLEASE SELECT A PRODUCT FOR PURCHASE

METHOD AND APPARATUS FOR MONITORING AND SYNCHRONIZING USER INTERFACE EVENTS WITH NETWORK DATA

This application is a continuation of U.S. patent application Ser. No. 11/616,616, entitled: METHOD AND APPARATUS FOR SYNCHRONIZING USER INTERFACE EVENTS WITH NETWORK DATA, filed Dec. 27, 2006 now U.S. Pat. No. 8,127,000, which claims priority to U.S. Provisional Patent Application Ser. No. 60/806,443, filed Jun. 30, 2006 the disclosure of which is incorporated herein by reference in its entirety.

BACKGROUND

Users access web applications on remote web servers. In one example, the web applications allow users to purchase certain products or services online. However, the user may experience problems while conducting the online purchase. For example, the web application may crash every time the user selects an icon on a web page used for an online purchase. In another situation, the user may not be able to determine how to complete the online product purchase from the instructions displayed on the web page. In a different situation, the web application may prevent the user from selecting particular items. In yet another situation, the web site may slow down or crash during certain periods of time or for particular operations. These are just a few of the many problems that may arise during an online network session.

These problems can negatively effect an e-commerce business. For example, a negative user experience during the online session may cause a potential customer to give up and abort the purchase of a particular product. Even worse, the potential customer may stop visiting the enterprise web site. Accordingly, it is important to be able to monitor user experiences during commercial online sessions and identify any problems.

Systems currently exist for monitoring web sites. However, these systems do not capture all of the information necessary for reproducing a network session. For example, certain problems may arise while a user enters information into fields on a particular web page. However, some of these errors may never be sent over the network to the web server that operates the web session. Further, some of these errors may never be persisted or noticed anywhere either on the web server or on the user terminal operating the web session. Thus, certain network session problems that a user may experience can not currently be reproduced and analyzed.

The present invention addresses this and other problems associated with the prior art. The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIGS. 4A-4F show an example of portions of a network session replayed by the ETR system shown in FIG. 1.

DETAILED DESCRIPTION

Figure 1:
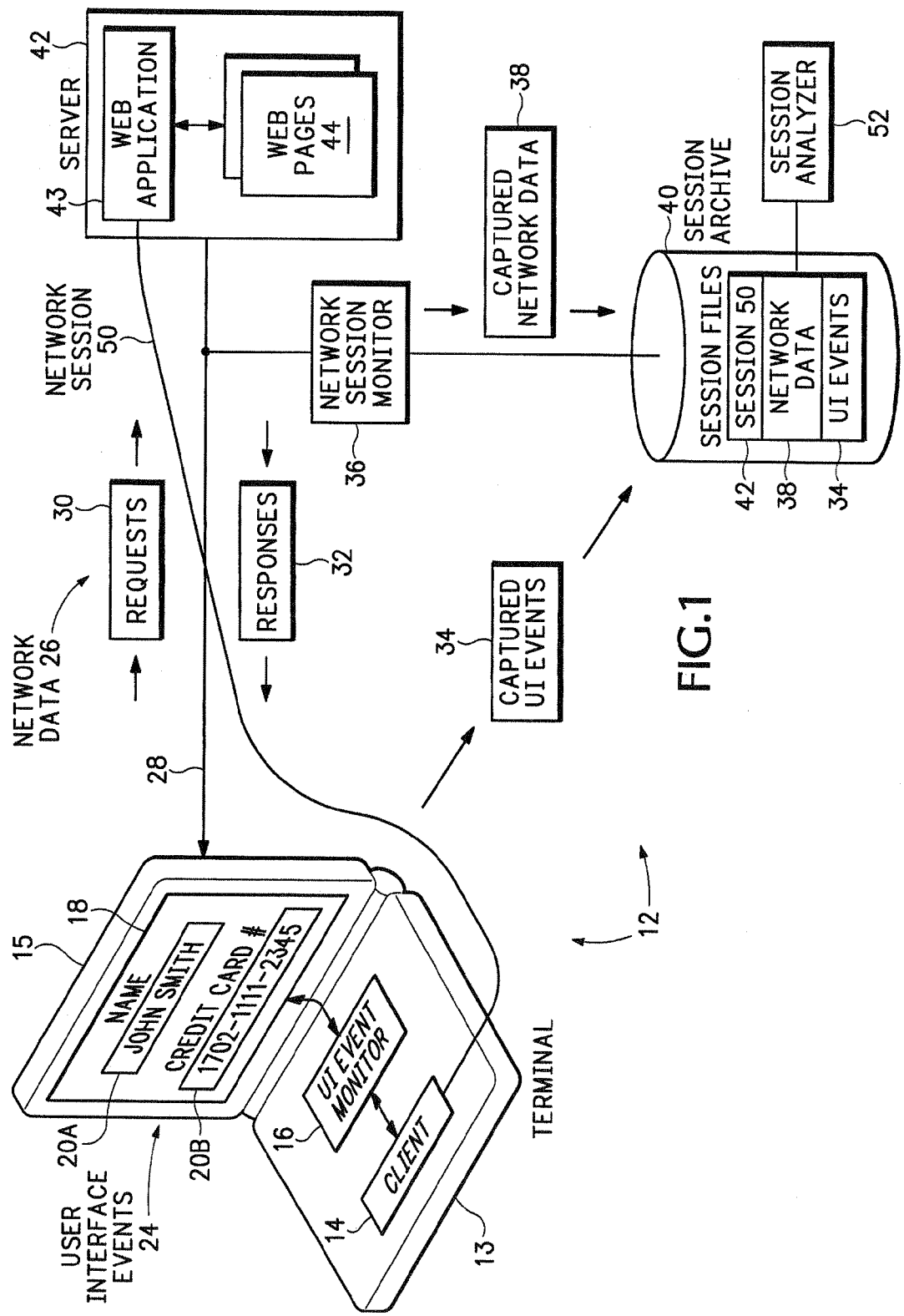
FIG. 1 is a block diagram showing an Event Tracking and Replay (ETR) system.

FIG. 1 shows an Event Tracking and Replay (ETR) system 12. A client 14 operating on a terminal 13 establishes a network session 50 with a web application 43 operating on a web server 42. Most of the network sessions conducted over the web are stateless in that the network connections are dynamically created and torn down as needed. Therefore, logical user sessions may consist of multiple network sessions. It should be understood that the ETR system 12 can be used with any variety of network sessions or logical user sessions that may be established over a network.

The terminal 13 can be any device used for accessing or exchanging information with server 42 over a packet switched network 28. The terminal 13 in one example may be a Personal Computer (PC), laptop computer, wireless Personal Digital Assistant (PDA), cellular telephone, or any other wired or wireless device that can access and exchange web information with web application 43.

The server 42 is any computing system that can operate one or more web applications 43 that are accessed by different clients 14 that may use different web browsers on multiple different terminals. For simplicity, only one client 14 is shown in FIG. 1. However, it should be understood that multiple different clients 14 may exist and be monitored. The web application 43 could be used for conducting any type of online session such as online purchases or online financial services. However, these are just examples, and any type of electronic web based transaction or other online activity can be performed using web application 43.

A user of client 14 accesses the web application 43 on server 42. For example, using HyperText Transport Protocol (HTTP) or HTTP over Secure Sockets Layer (SSL) (HTTPS). According to different requests 30, the web application 43 sends different responses 32 back to the client 14 that may include different web pages 44, web page logic, or other data used during the web session 50. In this example, a User Interface (UI) 15 on terminal 13 is currently displaying a web page 18 provided by the web application 43. The web page 18 includes two fields 20A and 20B that prompt a user to enter a name and credit card number, respectively.

The user enters information into fields 20A and 20B and may then select an "enter" icon (not shown) that causes the information in fields 20A and 20B to be sent back to web application 43 as additional requests 30. The web application 43 may then send back other network data, such as responses 32 according to the information contained in previous requests 30. In this example, the next response 32 from web application 43 may be information confirming the completion of an online transaction that used the user information previously entered into fields 20A and 20B. In other instances, the responses 32 can include other web pages, or other information responsive to different requests 30.

Network Monitoring

The ETR system 12 includes a network session monitor 36 that captures network data 26 that may include the requests 30 and responses 32 exchanged between the client 14 and web application 43 over packet switched network 28. The ETR system 12 also includes a User Interface (UI) monitor 16 that captures user interface events 34.
performed by client 14 that include, but is not limited to, events that may only occur locally on terminal 13. Capturing both the network data 26 and UI events 34 for a network/web session 50 allow the ETR system 12 to monitor and reproduce network sessions with a higher level of granularity and reproduce and detect events that may not be discoverable with existing network monitoring systems. As a result, the ETR system 12 can provide analytics for a wider array of network session events that happen during customer online experiences.

One example of a network session monitor 36 is described in U.S. Pat. No. 6,286,030 issued Sep. 4, 2001, entitled: Systems and Methods For Recording and Visually Recreating Sessions in a Client-Server Environment; and also described in U.S. Pat. No. 6,286,098 issued Sep. 4, 2001, entitled: System and Method For Encrypting Audit Information in Network Applications, which are both herein incorporated by reference in their entirety.

The network session monitor 36 monitors the packet switched network 28 for any network data 26 that is transferred between web application 43 and client 14 over network 28 during network session 50. As described above, this network data 26 may include any information exchanged between client 14 and web application 42 during a particular network session 50. For example, the network data 26 may include web pages 44 sent from web application 43 to client 14 and information sent from client 14 back to web application 43, such as the information entered into fields 20A and 20B.

The network data 26 can also include web page logic/code that is sent by web application 43 along with the web pages 44 to the client 14. This web page logic is then executed locally on the terminal 13 by client 14. Network data 26 can also include web session data that may not necessarily include web pages 44, but alternatively includes information that is used with a previously supplied web page 44. The significance of these types of network data 26 are described in more detail below.

The network session monitor 36 may be located anywhere on the packet switched network 28 where the network data 26 for network session 50 can be captured. In one example, the network session monitor 36 may operate on the same server 42 that operates the web application 43. In another embodiment, the network session monitor 36 could operate on a separate server that might be located within the same enterprise network as server 42. In another embodiment, the network session monitor 36 is located somewhere else in packet switched network 28. In yet another embodiment, the network session monitor 36 may operate on the same terminal 13 that operates the UI event monitor 16.

Many of the events that happen during the network session 50 may not necessarily be transferred over network 28. Thus, network session monitor 36 may only capture a portion of the information that is required to thoroughly analyze the network session 50. For example, the individual key strokes or cursor selections used for entering information into fields 20A and 20B of web page 18 may never be transferred back over network 28 to the web application. Alternatively, a batch data transfer of only the completed information from web page 18 may be transferred to web application 43 over network 28. Further, the logic sent along with the web pages 44 may autonomously change the state of a web page or the state of the web session locally on terminal 13 without ever sending information back over the network 28 to web application 43. This presents a problem when trying to fully analyze a user experience during a previously occurring network session 50.

User Interface Event Monitoring

The UI event monitor 16 is used in conjunction with the network session monitor 36 to increase the visibility and recreation granularity of online user experiences. The UI event monitor 16 monitors and captures UI events 34 that interact with the network data 26 for the network session 50. The UI event monitor 16, in one example, is a Javascript application that is downloaded to the client browser 14 via a Hyper Text Markup Language (HTML) tag. Of course, other types of software instructions can also be used for implementing the UI event monitor 16.

The UI event monitor 16 operates autonomously from web application 43 and detects certain UI events 34 associated with a particular network session 50 established between the web browser client 14 and web application 43. By operating locally on terminal 13, the UI event monitor 16 can detect certain or selected events performed by client 14 on web page 18. For example, the UI event monitor 16 can detect each character entered into the fields 20A and 20B. The UI event monitor 16 can also detect when a user selects different icons displayed on the web page 18 or when the user makes selections on the web page that cause the web session to display another web page or web link or that generally change the state of the web session. Some of these UI events 34, or sequence of events, might only be detectable locally on terminal 13 and never transferred over network 28.

The local UI events 24 associated with the network session 50 are captured by the UT event monitor 16 and then automatically transferred at captured UI events 34 to a session archive 40. Similarly, the network session monitor 36 sends the captured network data 38 for the network session 50 to the same session archive 40. A session analyzer tool 52 is then used to analyze the captured network data 38 and the captured UI events 34 for the network session 50. The ETR system 12 provides the unique combination of capturing both network data 26 exchanged between client 14 and web application 43 during a web session 50 as well as capturing the UI events 34 that are entered locally by a user when interacting with the network data 26. Based on what analytics need to be preformed, the captured network data 38 and captured UI events 34 may be analyzed separately, in combination, or synchronized together to virtually replay the previous network session 50.

Figure 2:
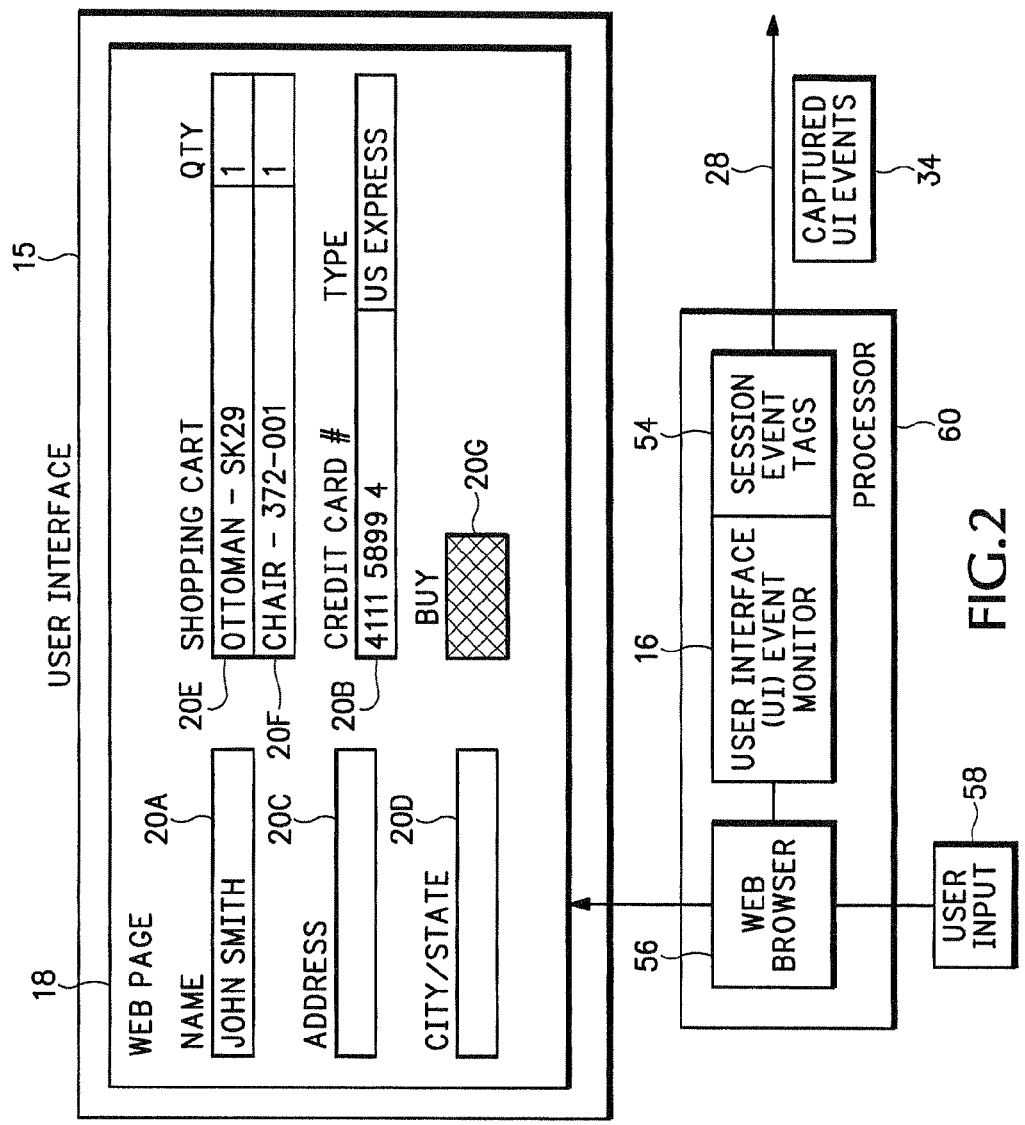
FIG. 2 is a block diagram showing a User Interface (UI) event monitor from FIG. 1 in more detail.

FIG. 2 shows the UI event monitor 16 in more detail. In this embodiment, a processor 60 operating in terminal 13 operates a web browser 56 that establishes the network session 50 with the web application 43 in FIG. 1. During the network session 50, the web application 43 in FIG. 1 downloads one or more web pages 18 to web browser 56 which are then displayed on user interface 15. The web page 18 in this example includes the name field 20A and credit card field 20B previously shown in FIG. 1. Other fields may also be located on the web page 18, such as an address field 20C, city and state fields 20D, selected items (shopping cart) fields 20E and 20F, and a buy button icon 20G. These again are just examples of any type of information that may be displayed on the web page 18.

The UI event monitor 16 assigns session event tags 54 to the captured UI events 34. For example, the captured events may be tagged with an associated session ID value and an associated time stamp value by UI event monitor 16. The captured UI events 34 and associated session event tags 54 are then sent to the session archive 40 in FIG. 1.

Figure 3:
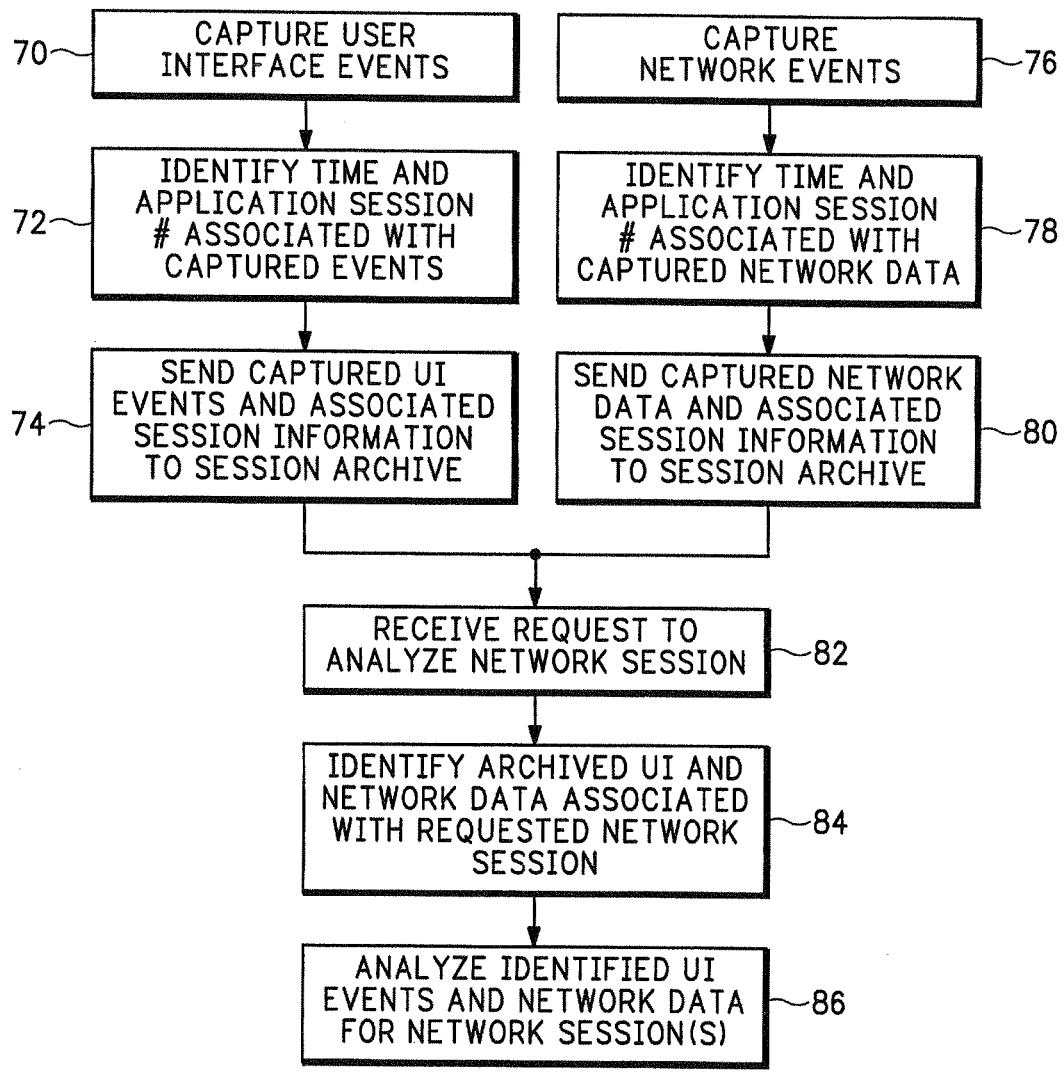
FIG. 3 is a flow diagram describing operations performed by the event tracking and replay system shown in FIG. 1.

FIG. 3 shows in further detail how the network and UI events are captured and then used to analyze a previous network session. In operation 70, the UI event monitor 16 captures UI events as described above in FIGS. 1 and 2. The UI event monitor 16 in operation 72 identifies the network session ID, time stamp value, and any other session information that may be needed for associating the captured UI events with a particular network session.

The web application 43 may provide a common application session number for different web pages and other information associated with the same network session. If it does not already exist in the captured UI event, the UI event monitor 16 can attach the application session number for the associated network session to the captured UI events. The UI event monitor 16 may then add any other time stamp or session identification information prior to sending the captured UI events 34 to the session archive 40 (FIG. 1) in operation 74.

The time stamps are used for synchronizing and replaying the captured UI events 34 with the captured network data 38 (FIG. 1) in the same sequence as originally rendered during the network session 50. The UI events 34 may be grouped together for some period of time and then sent in a batch to the session archive 40. Alternatively, individual captured UI events 34 may be sent to the session archive 40 or captured UI events 34 may be grouped and sent according to different user activities.

The network session monitor 36 (FIG. 1) in operation 76 captures network data for the network session 50. In operation 78, the network session monitor 36 identifies any session information, such as the web application session number, needed to associate the captured network data 26 (FIG. 1) with a particular network session. If needed, the network session monitor 36 will also tag the captured network data with a time stamp. The tagged network data 38 is then sent to the session archive in operation 80.

Operations 82-86 refer to the session analyzer 52 previously shown in FIG. 1. In operation 82, the session analyzer 52 may receive a request to analyze some or all of a captured network session, such as network session 50. The network session 50 may be identified using the corresponding application session number, time identifier, source address, destination address, or any other information that associates the archived information with the same network session. In operation 84, the session analyzer 52 identifies any of the archived UI events 34 and network data 38 associated with the specified network session. In operation 86, the session analyzer 52 uses the identified UI events and network data to analyze the previous network session 50.

In one example, the session analyzer 52 uses the time stamp values attached to the captured UI events 34 and captured network data 38 to determine the sequence that the different events were executed or rendered during the original network session. The session analyzer 52 synchronizes the captured UI events 34 and captured network data 38 using the time stamp values then replaying or recreating the original network session.

For example, network data 26 associated with transferring web page 18 to the client 14 in FIG. 1 may have a first time stamp value. A next set of UI events associated with entering different text characters into the fields 20 of web page 18 may have later sequentially increasing time stamp values. Accordingly, the session analyzer 52 can first display the web page 18 and then replays the entry of the captured UI events 34 into the fields 20 of re-rendered web page 18 in the same order the information was originally entered by client 14 (FIG. 1).

Any portion of the synchronization process can be automatically replayed by the session analyzer 52. For example, session replay can be specified for a particular window of time or for a particular portion or stage of a captured network session.

Recreating Network Sessions

Figure 4A:
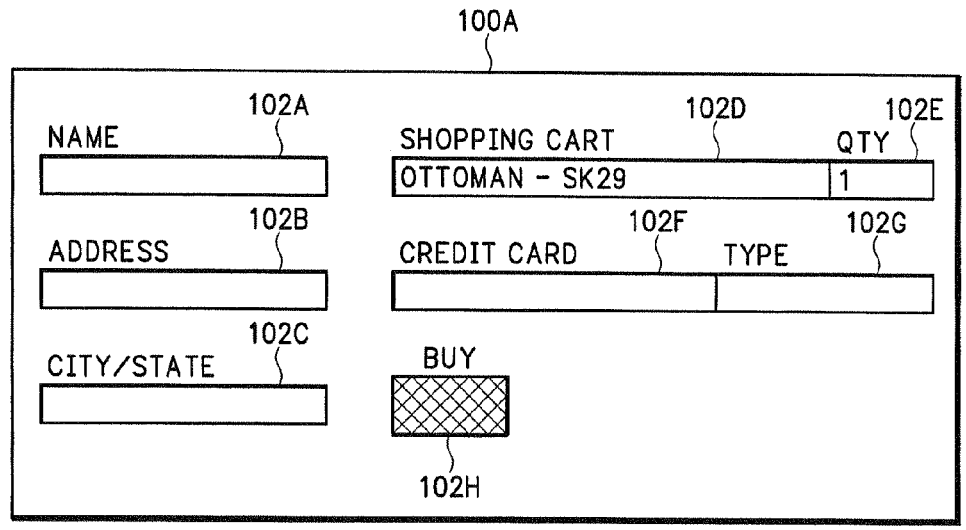

FIGS. 4A-4F show how the captured UI events 34 and captured network data 38 (FIG. 1) are used to recreate a network session. FIG. 4A shows information captured from a previous network session using the ETR system 12 and then replayed using the session analyzer 52 previously described in FIG. 1. Different states of a web page 100 are shown for a web session that was previously conducted between the web application 43 and the client 14 in FIG. 1. The web page 100 includes a name field 102A, address field 102B, city/state field 102C, selected item (shopping cart) field 102D, quantity field 102E, credit card field 102F, credit card type field 102G, and a buy selection icon 102H.

FIG. 4A shows a web page state 100A recreated during replay where a user had selected an item for purchasing. The shopping cart field 102D shows the item previously selected by the user and the quantity field 102E shows one item was selected for purchase. The web page state 100A shows that fields 102A, 102B, 102C, 102F, 102G, and 102H required for completing the online purchase have not yet been filled out.

Figure 4B:
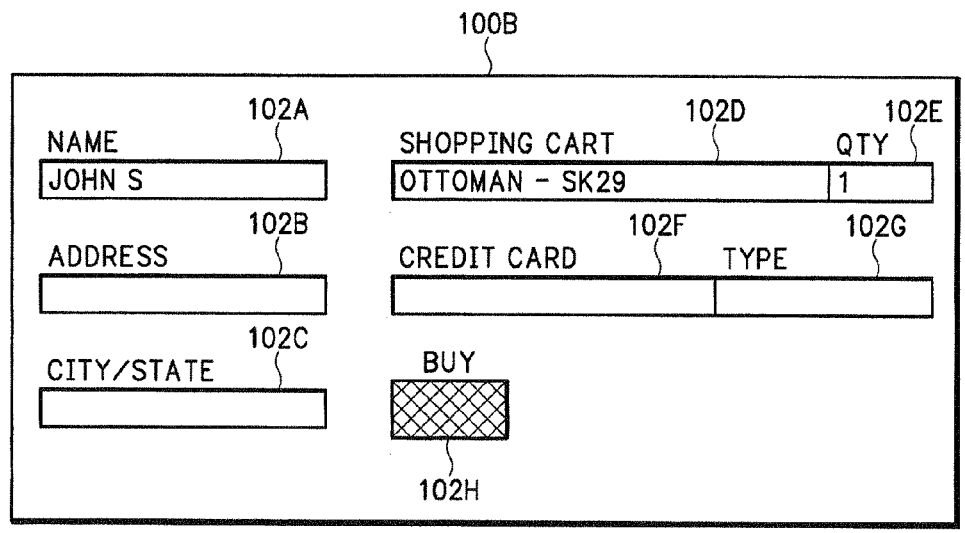

FIG. 4B shows another state of the network session replay where the user entered a portion of name information into the name field 102A. As described above, the session replay may display each individual character entered into each field or could store information in a coarser resolution that may only show the completed entries for each field 102. Either way, the session analyzer 52 can replay a sequence of session events that may not necessarily be observable simply by capturing the network data 26 transferred over network 28 (FIG. 1).

FIG. 4C shows another later state of the network session where the user completed entering information into all of the fields 102A-102G and then selected the buy icon 102H either via a keyboard enter button or via a mouse click. Web page state 100C also shows that the user entered a credit card number 104 into the credit card field 102F that incorrectly included only 15 numbers, instead of a required 16 numbers.

FIG. 4D shows a recreated message 106 that was previously displayed during web page state 100D that notified the user of the invalid credit card number entered into the credit card field 102F. Correctly, the web application erased the incorrect credit card number from credit card field 102F. However, in this example, the recreated web session also shows that the web application 43 erroneously erased the item previously selected for purchase from the shopping cart fields 102D and 102E. One scheme for recreating the message 106 is described in U.S. Pat. No. 6,286,030 which is herein incorporated by reference.

It is worth noting that in some network sessions, error message 106 might have only been generated locally on the terminal rendering web page 100. Accordingly, the network data 26 shown in FIG. 1 might not have contained the error message 106 displayed on the web page 100 or revealed the bug in the web application that erroneously deleted the shopping cart item from fields 102D and 102E.

The UI event monitor 16 allows the capture and recreation of these locally generated UI events that can then be used to more effectively identify network session problems. For example, the session analyzer 52 can recreate the network session then identify the error message 106 that may not have ever been persistently stored during the original network session 50. The web application administrator can also use this recreated network session to discover normally non-detectable network session problems, such as the bug that deleted the shopping cart item from fields 102D and 102E.

FIG. 4E shows a later state of the replayed network session where the user reentered credit card information into fields 102F and 102G and then selected the buy icon 102H. In this example, the information in fields 102F and 102G was correctly entered. However, the selected item information in shopping cart fields 102D and 102E no longer exists due to erroneous deletion by the web application as shown by the recreated web page state 100D in FIG. 4D. Accordingly, the web application in a next replayed web page state 100F shown in FIG. 4F displays an error message 108 that notified the user that an item was not entered into fields 102D and 102E.

From the session replay shown in FIGS. 4A-4F, an administrator can determine that the web application has a bug that undesirably deletes information from fields 102D and 102E when an incorrect credit card number is entered into field 102F. This bug could frustrate a potential purchaser who would have to go back to previous web pages to reselect the item in field 102D. This user experience could cause a purchaser to terminate the online network session and not purchase a previously selected item.

The session identifiers associated with UI events and network data can also be used for analyzing other types of network session problems. For example, different types of errors can be tracked according to the time stamps associated with the captured information. Network sessions can also be analyzed according to different types of web browsers, different types of web operations, system performance, web pages last used, common information presented in the web page, last event initiated by the user, last event received from the web application, etc.

Capturing Non-Persistent Local Network Session Events

Figure 5:
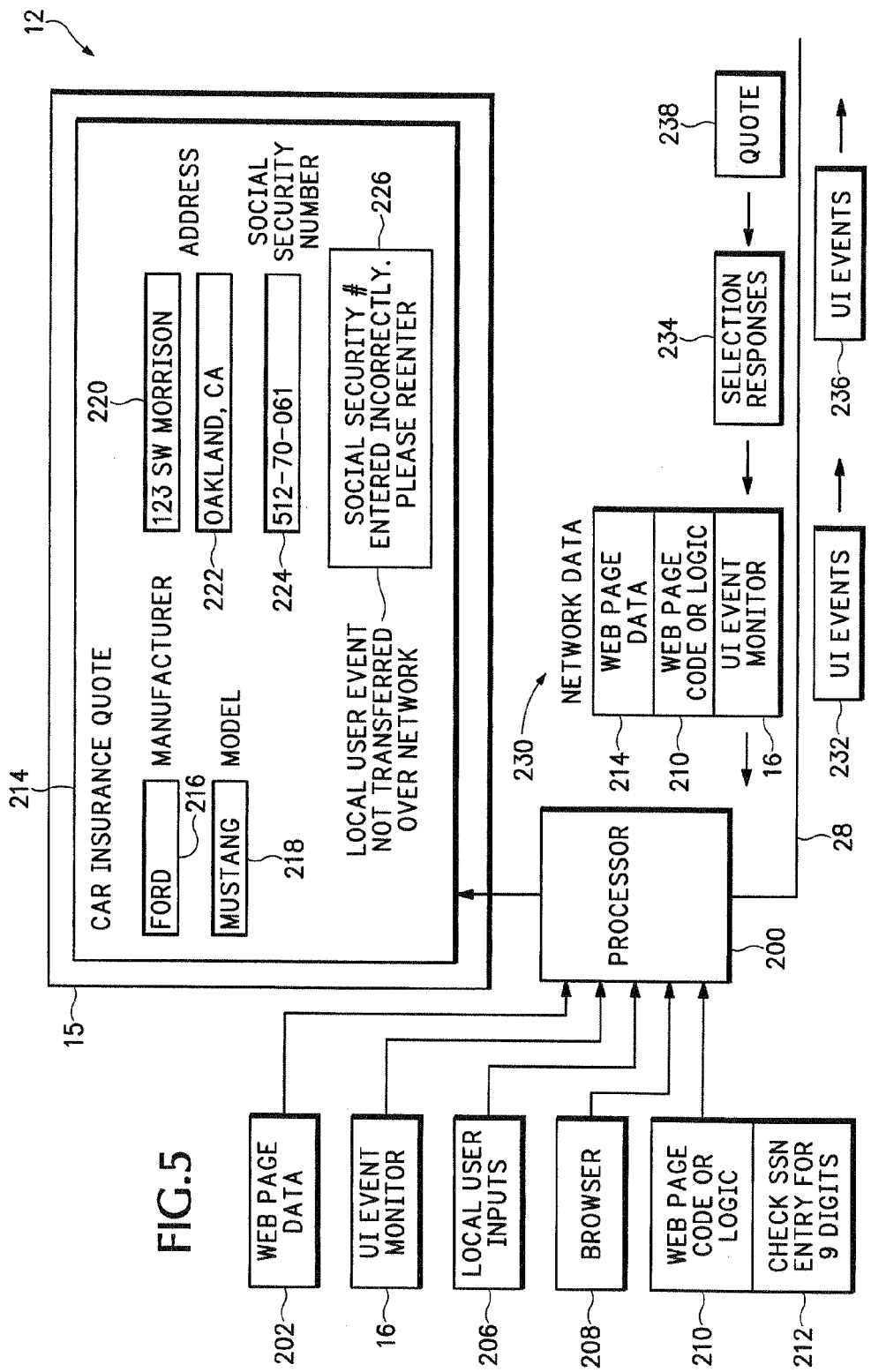
FIG. 5 shows the different information and operations used by an the ETR system to recreate a network session.

FIG. 5 describes in more detail how the Event Tracking and Replay (ETR) system 12 recreates different network session events and previous session states that may only occur locally on a user terminal and further may never be persistently stored during the network session. The ETR system 12 includes a processor 200 that uses different types of data and logic that includes web page data 202, UI event monitor 16, user inputs 206, browser 208, and web page code or logic 210.

During a network session, the web application may send network data 230 that includes web page data 214, logic that operates the UI event monitor 16, and web page logic 210. The web page logic 210 is used for conducting different local operations associated with the network session. For example, the web page logic 210 can be used to check for correct entries in fields 216-224 of web page 214. In one example, the web page logic 210, among other things, is used for verifying a nine digit number is entered into the social security number field 224.

Current web applications also may not necessarily send new web pages for each new web page state. For example, the web application may supply certain base web pages, such as web page 214, during the web session. Then based on a user selection or entry 232, the web application may respond with other information 234 that is used with the same base web page 214. The ETR system 12 can be used to recreate web sessions that use any of these different types of web applications.

In this example, a user may have initiated the web session by entering an http or https address through the web browser 208. The web application associated with the address responds back with web page data that includes web page 214, web page logic 210, and the UI event monitor 16. The web page 214 is rendered on the user interface 15 via web browser 208. In this example, the web page 214 is used for providing car insurance quotes. Of course, any other type of information can be provided on web page 214. The web page 214 includes a car manufacturer field 216, a car model field 218, address fields 220 and 222, and a Social Security Number (SSN) field 224.

In this example, a user entered a car manufacturer name into field 216. This information is sent back to the web application as user selection 232. Accordingly, the web application may send back additional web session information 234. For example, if the user enters a particular car manufacturer name into field 216, the web application may then send back all of the car models associated with the selected car manufacturer in one of the responses 234. These associated car models may then be displayed in a drop down menu in car model field 218.

The user may then supply or select other UI inputs 232 such as the car model and year. Accordingly, the web application may send back other responses 234 that in this example, include the same or another web page 214 that requests the user to enter personal information, such as shown by address fields 220 and 222, and a social security number in SSN field 224. The user input into fields 220, 222, and 224, may then be sent back to the web application as UI inputs 236. If all of the user inputs 232 and 236 are in the proper form, the web application then sends back a car insurance quote in response 238 which is displayed on web page 214.

In this example, the web page logic 212 performs the nine digit SSN check locally at the terminal. If the social security number is incorrectly entered into SSN field 224, the web page logic 212 displays an error message 226 on web page 214.

This error message 226 may never be transmitted over the network 28 to the web application. Further, the error message 226 may never be persistently stored by the web terminal. For example, the error message 226 may only temporarily be displayed on web page 214 until another social security number is entered into SSN field 224. After another social security number is entered, or if the web session is terminated, there is no further evidence that the error message 226 was ever displayed.

Figure 6:
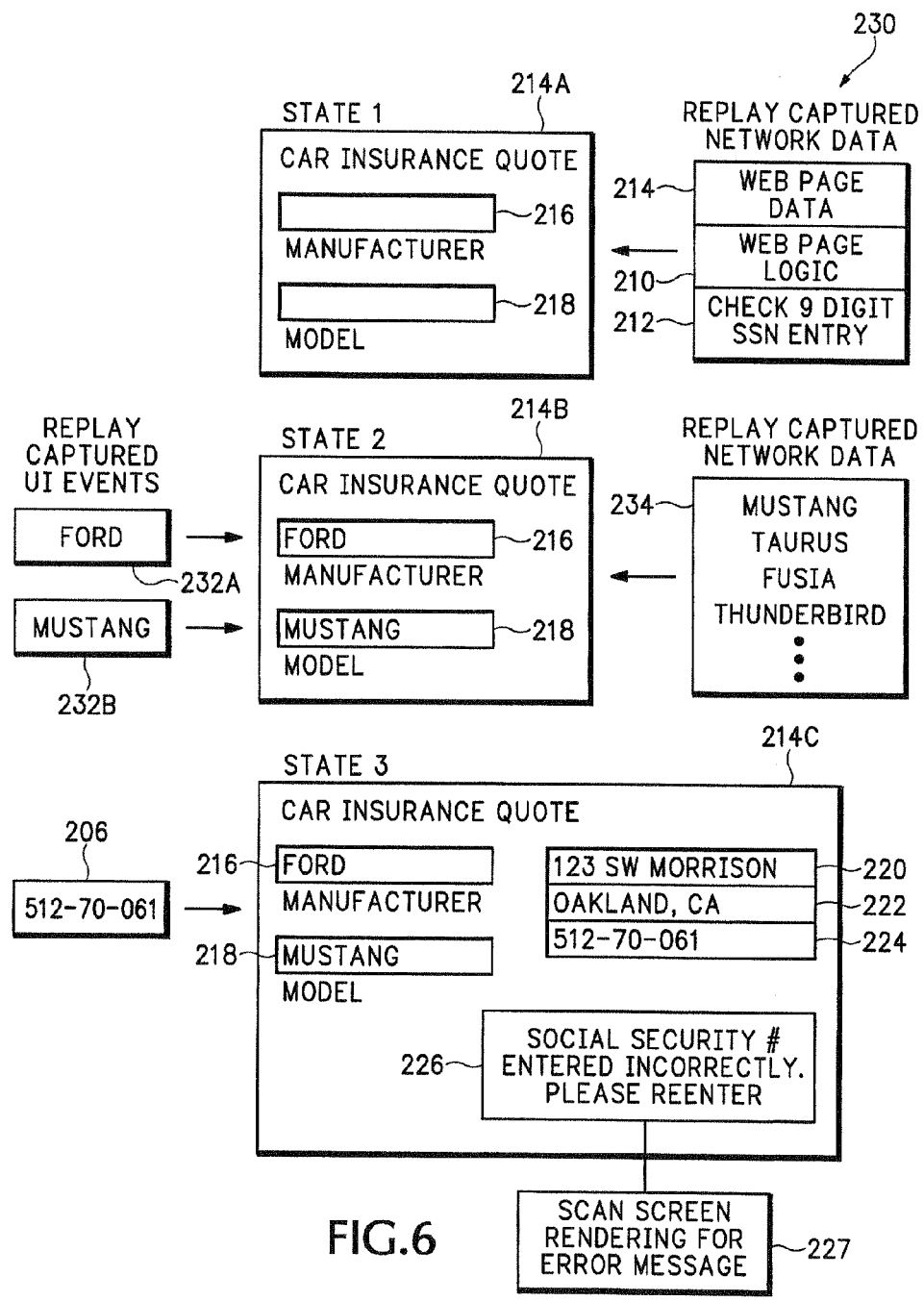
FIG. 6 is a diagram that shows how the ETR system in FIG. 5 recreates the local non-persistent session events.

FIG. 6 explains in more detail how the ETR system 12 in FIG. 5 identifies and captures these non-persistent local events and other web session states during a virtual replay. It should be noted that the web page logic 210 was also captured and stored in the session archive 40 in FIG. 1 and associated with the same network session as web page 214. This allows the ETR system 12 to reproduce the same logic states that existed during the original web session. In a first replay state, the session analyzer 52 in FIG. 1 re-renders the web page data 214 in a same web page state 214A as originally displayed to the user during the previous web session.

In a second web page state 214B, the captured UI events 232A and 232B are applied to the rendered web page 214 in the same order originally entered during the web session. For example, the user may have initially entered a car manufacturer name 232A into field 216. This may have prompted the web page logic 210 to send a request back to the web application for all car model names associated with the specified manufacturer name 232A. This may have accordingly caused the web application located on the server to send back responses 234 listing all of the relevant car model names. Accordingly, the next captured UI event 232B may have selected one of the listed car model names 234.

Another web page state 214C shows the session replay immediately after the user entered the incorrect social security number 206 into SSN field 224. It should be noted that the user event 206 may have only happened locally on the network terminal. This is distinguished from other user inputs 232A and 232B that, in this example, may have been forwarded over the network connection 28 (FIG. 5) to the web application. As previously described above in FIG. 5, the web page logic 210 may screen information entered into fields 216-224 prior to moving to another web page or sending user inputs to the web server. In this example, the incorrectly entered social security number 206 is detected by the web page logic 212 in FIG. 5 and discarded without ever being sent over the network connect 28 to the web application. The web page logic 212 then displays the error message 226 that notifies the user to enter a correct social security number.

The session analyzer 52 in FIG. 1 performs a screen scan 227 during the session replay that identifies the recreated error message 226. This error information is then possibly captured and then stored in a persistent storage in the session archive 40 in FIG. 1 for subsequent analysis. It should also be noted that the session replay described in FIG. 6 may be a virtual replay that is never actually seen or performed by a human being. In other words, the replay in FIG. 6 may be automatically performed by the session analyzer 52 in FIG. 1 without a system administrator having to manually step through each session state.

Figure 7:
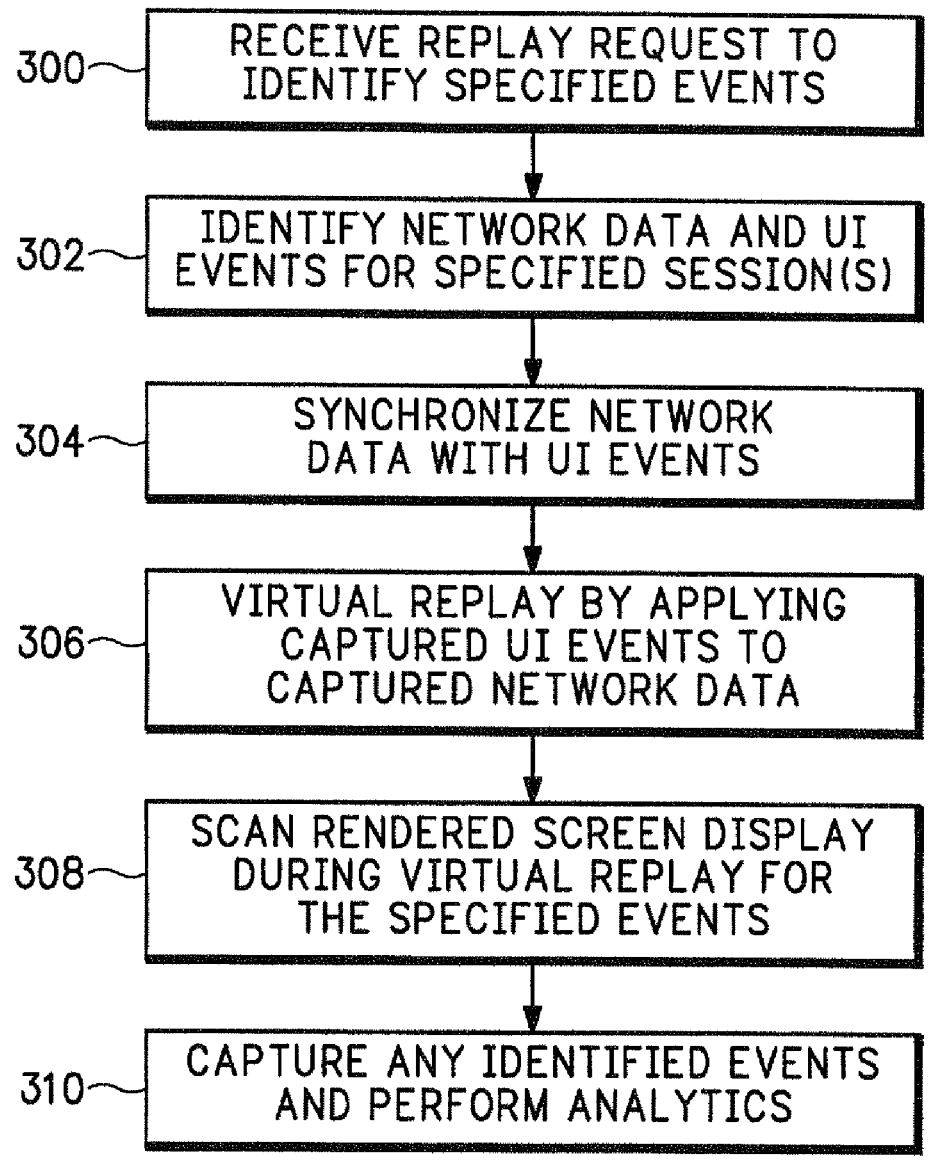
FIG. 7 is a flow diagram explaining in more detail how the ETR system recreates the local non-persistent session events.

FIG. 7 explains some of the operations in FIG. 6 in more detail. Prior to receiving a replay request, the ETR system 12 captures network data associated with a network session at a first location. The network data may include, but not be limited to, web page data transmitted over a network between a web server and a user terminal. The ETR system 12 also separately captures user interface events associated with the same network session at a second user terminal location. The user interface events include, but are not limited to, user inputs for interacting with the web page data.

In operation 300, the session analyzer 52 receives a replay request to identify certain specified events for a particular network session. There can be any number of network sessions that may be identified. For example, network sessions for particular users, for a particular time of day, for a particular web application or web server, etc. The session analyzer 52 in operation 302 identifies the captured network data and UI events for the relevant network sessions. The session analyzer 52 may use the session identifiers assigned to the captured network data and the captured user interface events to identify the relevant captured information.

In operation 304, the session analyzer 52 synchronizes the captured UI events with the captured network data in a similar order as previously executed during the original network session. A virtual replay is performed for the network session in operation 306 by applying the synchronized UI events to the synchronized network data. The virtual replay provides a rendering in substantially the same manner as originally rendered during the network session. The re-rendered network session can accordingly recreate messages, events, or states that may have only occurred locally on the web terminal or that were never persistently stored after originally being rendered during the original network session.

In operation 308, the session analyzer scans the re-rendered network session for specified events, messages, states, etc. Screen scanning is well known and is therefore not described in further detail. Any identified events are then captured in operation 310 for further analysis of the user experience in the original network session.

The virtual replay described above can also be used to identify and capture more complex web page operations and states. For example, the virtual replay can track and capture Document Object Model (DOM) or Asynchronous JavaScript Technology and XML (AJAX) events performed during the original network session. This JavaScript technology allows a HTML page to asynchronously make calls to the server from which it was loaded and fetch XML documents. The XML documents may then be used by the JavaScript technology to update or modify the Document Object Model (DOM) of the HTML page.

The virtual replay can reproduce these AJAX events and states that otherwise may not be detected simply by monitoring network data. For example, the AJAX code may be used to retrieve different components for an existing page from the web application 43 running on the server 42 in FIG. 1. In one example, the web application 43 may provide an electronic map to a user. The user may select an arrow on a web page map to request a display for a different portion of the electronic map. The web application may not necessarily send a new web page each time the user selects a different portion of the electronic map. Alternatively, the web application sends another portion of the electronic map to the client and then uses the existing web page to display the new map information.

The UI event monitor 16 in combination with the network session monitor 36 in FIG. 1 captures this additional map information and user arrow requests and associates it all with the same network session. Then during the virtual replay these different pieces of the same network session can be recombined to recreate the previous user experience using the electronic map.

Selective Event Archival

Figures 8, 9:
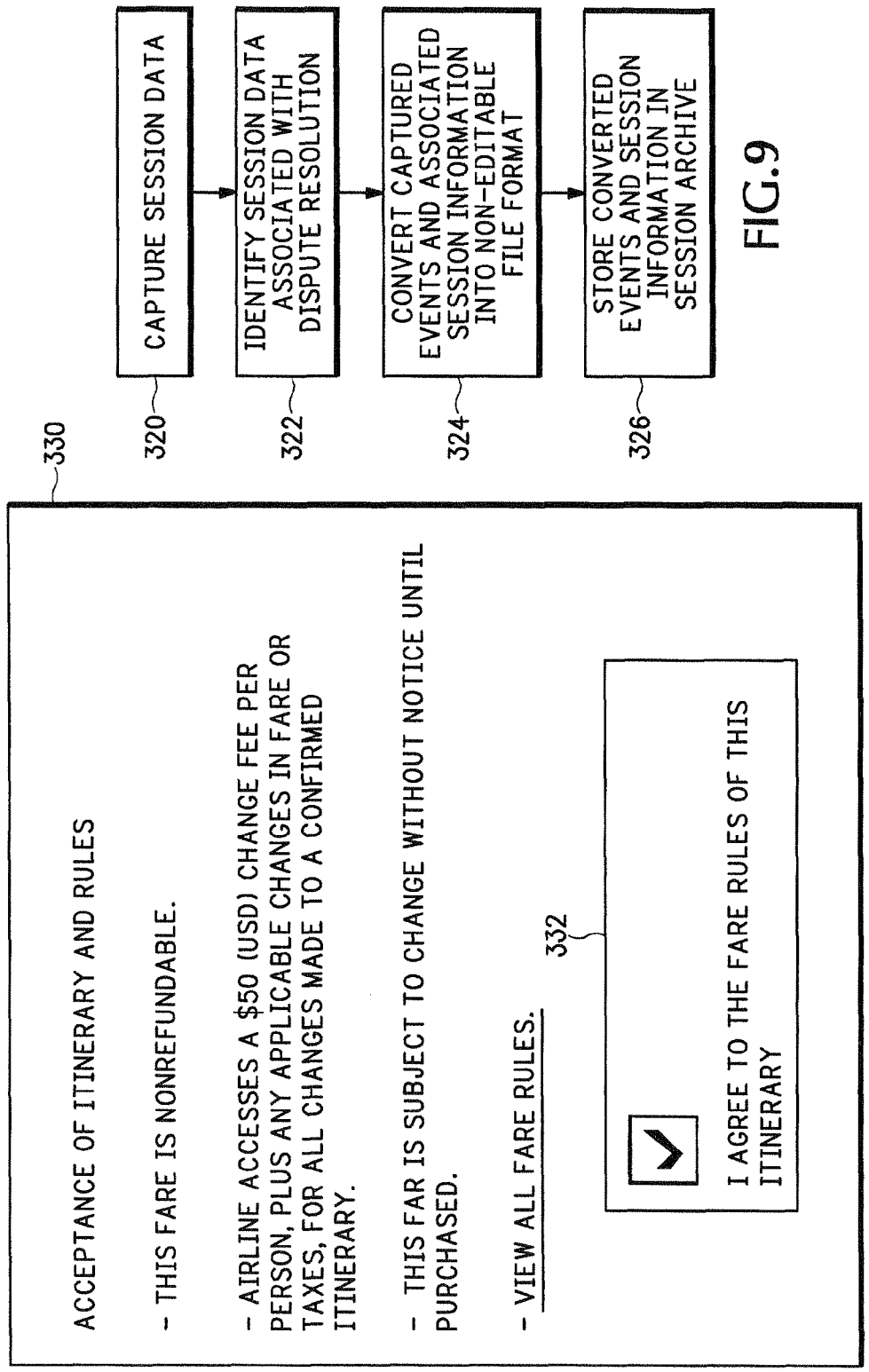
FIGS. 8 and 9 show how the ETR system can be used to capture dispute resolution events.

FIGS. 8 and 9 show another application for the ETR system 12. Dispute resolution events may occur during the network session. A dispute resolution event can be any web transaction that has some particular financial or legal significance. For example, a dispute resolution event may be a user selecting a buy icon on a web page when consummating an online purchase or displaying a web page to a user that contains the terms of conditions of a purchase. Other types of events could also be considered dispute resolution events and are not limited to events that have financial or legal significance.

FIG. 8 shows one example of a dispute resolution event where a user has selected an icon box 332 accepting the terms and conditions listed on a web page 330 for purchasing an airline ticket. Later, there could be a dispute regarding the airline ticket purchased via the web page 330 or a dispute regarding the terms related to the purchase of the airline ticket. The airline operating the online ticket service can use the session analyzer 52 in FIG. 1 to identify these particular dispute resolution events in session archive 40 (FIG. 1). These identified events may then be stored for some indefinite period of time longer than other captured events. If a dispute regarding the transaction occurs at some later date, the captured web page 330 can be used to help resolve the dispute.

Referring to FIG. 9, different network sessions are captured in operation 320 as described above. The session analyzer 52 is then used in operation 322 to identify the captured dispute resolution events. The dispute resolution events can be any combination of UI events and network data. As described, synchronizing these different captured events can provide a more accurate account of a previous portion of a network session. For example, a replay can actually show the user selecting a buy icon on a captured web page or show the user checking the confirmation box 322 in FIG. 8. The extracted session data can be used to improve the chances of an amicable dispute resolution. In other words, more precise recreations of particular session events may be more effective in resolving a misunderstanding related to a web transaction.

The session analyzer 52 can be configured to search through the session archive 40 on some configurable periodic time period and extract all of the conflict resolution events that correspond with a set of preconfigured filters. For example, the session analyzer 52 may identify web pages that complete an online purchase. Similarly, any UI events that indicate a user selected a purchase icon can also be identified and extracted for long term archival.

In one embodiment, different dispute resolution events can be assigned particular identifiers that are then used by the session analyzer 52 (FIG. 1) to extract relevant information from session archive 40. Alternatively, the session analyzer 52 can search for particular Uniform Resource Locators (URLs) in captured session data that may be associated with web pages containing disputed information.

In one embodiment, the identified dispute resolution data and any associated session parameters, such as the network session ID, source and destination IP addresses, time of day, session duration, transaction summary, etc., can be extracted from the event metadata in operation 324 and summarized. The summarized information can then be converted into a non-editable file format, such as a Portable Document Format (PDF) file.

The identified dispute resolution events can also be converted in operation 324 into a non-editable file format and saved along with the session summary. Of course, other types of file formats can be used and do not have to be non-editable. The identified and converted dispute resolution events are then stored either in a long term location in the session archive 40 in FIG. 1 or stored in some other long term archival system in operation 326.

Only a small portion of captured events may have dispute implications. Therefore, these particular types of events can be stored for longer periods of time without overloading enterprise storage archives. Other non-dispute related events may be stored in the session archive for shorter periods of time.

Whenever a particular user has a dispute, the enterprise administrator can call up all archived files for the identified user. Alternatively, the enterprise administrator can call up all transactions that may have occurred during a particular time period to locate the relevant network session. The summary page can be viewed and the different identified events selected to then replay the information previously displayed to the user and replay the actions that were previously performed by the user during the archived network session.

Converting the identified dispute resolution data into a non-editable file format reduces some of the issues regarding possible tampering of the archived session. A signature can also be generated for the PDF files that contain the complete set of all captured UI events and network data related to the dispute resolution activities. The signature can then be separately stored to confirm the authenticity of the PDF files.

Capturing Syndicated Content

Figure 10:
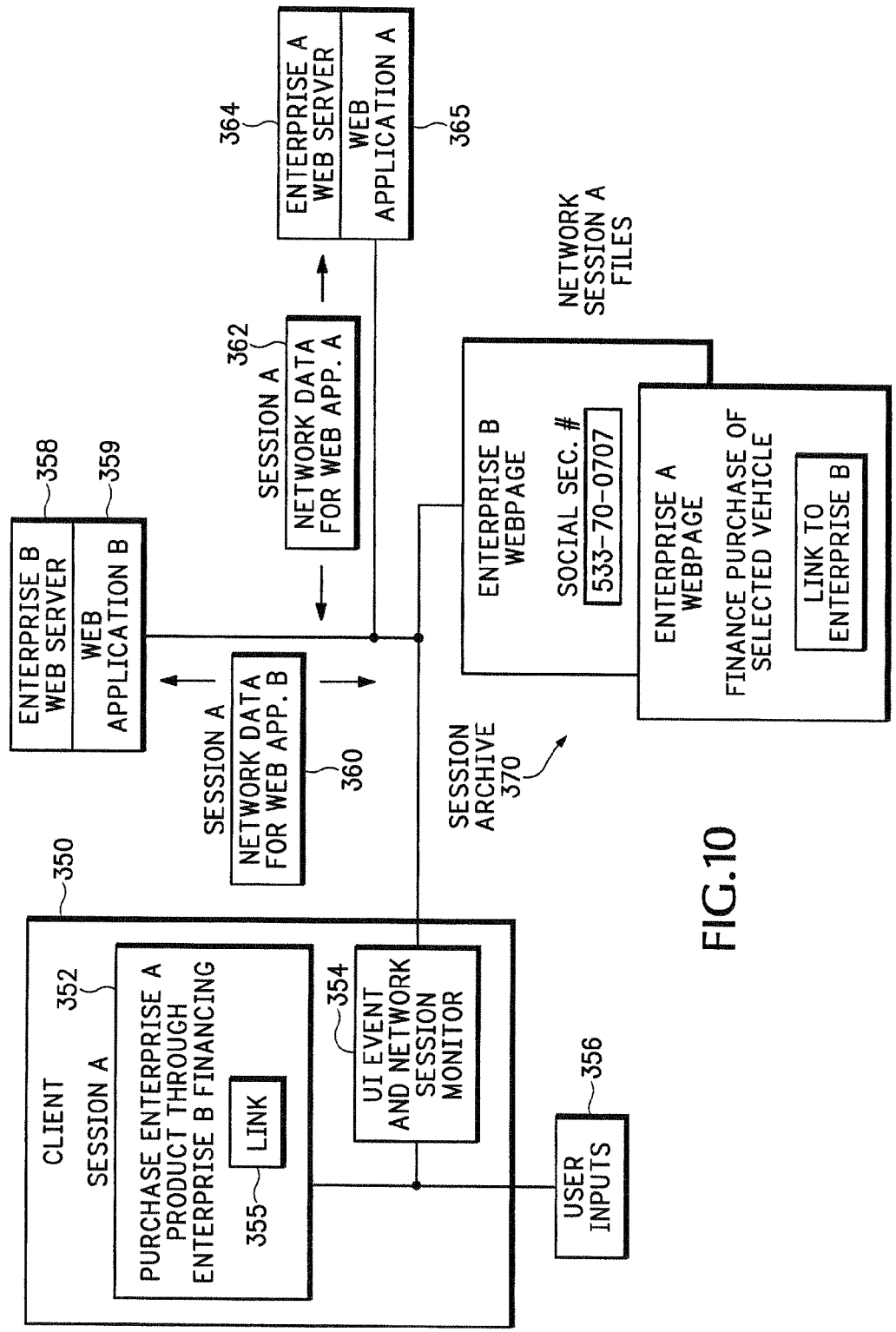
FIG. 10 shows a block diagram for an ETR system that detects events from syndicated web applications during a network session.

Web applications and network sessions may provide or use content from third party web applications. For example, FIG. 10 shows a client 350 that initially establishes a network session A with a web application 365 operating on web server 364 operated by an Enterprise A. A web page 352 is sent by web application 365 to client 350. In this example, the web page 352 is used by the client 350 to purchase a product. However, the web page 352 also includes a link 355 to a second web application 359 on a second web server 358 operated by a second enterprise B. The syndicated web application 359, for example, may provide financing services for the product selected and purchased from enterprise A using web application 365.

A UI event and network session monitor 354 is operated on client 350 and captures any UI events or network data associated with the network session A. For example, the network data 352 and 362 exchanged between web application 365 and client 350 is captured as well as the network data 360 exchanged between the web application 359 and client 350. In addition, all UI events that occur locally on client 350 during network session A are also captured. The UI events may be responsive or interact with network data 362 exchanged with web application A or network data 360 exchanged with web application B.

All of the network data and UI events related to the network session A conducted through web application 365 and web application 359 are then sent to a session archive 370. The session analyzer 52 (FIG. 1) then assembles and synchronizes all of the captured data and events associated with network session A.

Analyzing Network Session Times

Figure 11:
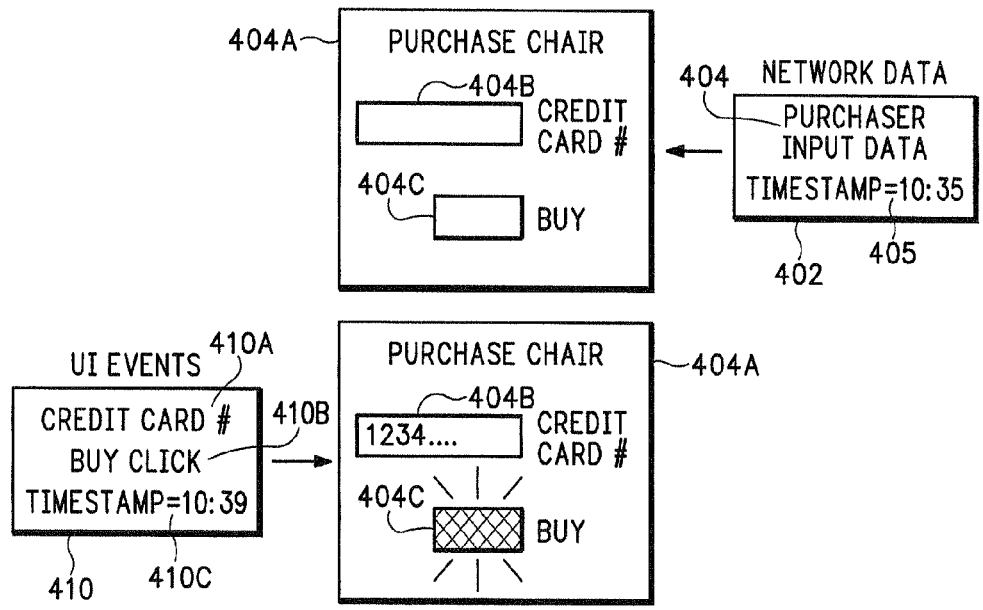
FIGS. 11-13 show another embodiment of the ETR system that provides time analytics for a captured network session.

As described above, the ETR system 12 may assign time stamps to different captured network data and UI events. These time stamps can be used to further analyze the user experience during a network session. Referring to FIG. 11, the ETR system 12 in FIG. 1 or FIG. 5 may capture network data 402 transferred over a network link between a web application and a client that contains purchaser input data 404. For example, the purchaser input data 404 may contain a web page 400A that includes a credit card number field 404B and a buy icon 404C. As described above, the captured network data 402 containing purchaser input information 404 may also be assigned a time stamp value 405 by the ETR system 12. This time stamp value 405 can be used to further analyze different user actions during the network session.

For example, UI events 410 are captured after the network data 402 and may include the entry of a credit card number 410A into the credit card number field 404B of web page 404A and selection 410B of the buy icon 404C in web page 404A. Similarly, the ETR system assigns one or more time stamp values 410C to the captured UI events 410.

Comparing the time stamp value 405 for the captured network data 402 with the time stamp value 410C for the captured UI events 410 can provide further insight into the user experience during a network session. For example, comparing multiple different network sessions may indicate that most completed online transactions occur within 5 minutes of the web application presenting the purchaser input information 404. FIG. 11 shows that the credit card number 410A and the buy icon selection 410B were entered into web page 404A four minutes (time stamp=10:39) after the purchaser input data 404 was sent to the client (time stamp=10:35). From network session analysis of multiple network sessions, the session analyzer 52 in FIG. 1 might discover that a user delaying more than 10 minutes to enter credit card information 410A into a web page field 404B is likely to result in an aborted transaction.

Figure 12:
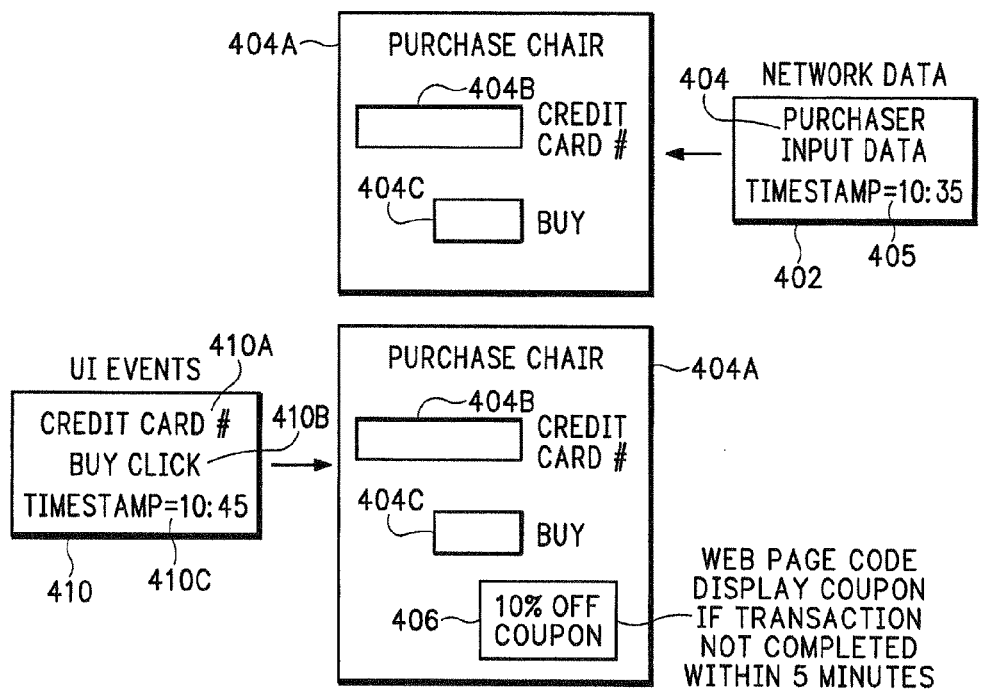

FIG. 12 shows one example of how the time analytics provided in FIG. 11 can be used to improve the completion rate of web transactions. The same web application previously analyzed in FIG. 11 is slightly modified to detect when a user takes more than 10 minutes to complete a web purchase. For example, the purchase input data 404 into field 404B is sent at time stamp value=10:35. If the user has not started entering a credit card number after 10 minutes, the web application may display a discount coupon 406 on the web page 404A.

It was previously determined from the network session time analytics in FIG. 11 that a 10 minute delay in entering a credit card number usually results in an aborted web transaction. Accordingly, the discount coupon 406 is displayed when a user credit card number 410A is not entered within 10 minutes. This may cause more online transactions to be successfully completed. In addition, the time analytics in FIG. 11 also provide information that prevents discount coupon 406 from being offered before most transactions are normally completed. This of course is just one example of the types of modifications that can be made to web applications based on time based web session analytics. Other types of user activities and session problems can similarly be detected. For example, the time stamps provided by the captured network data and captured UI events can be used to identify any web data that causes large delays in subsequent user responses. The time stamps can also be used to identify a time of day when different session errors occur or identify web application responses or UI responses that take an unusually large amount of time to respond to other network data or UI events.

Figure 13:
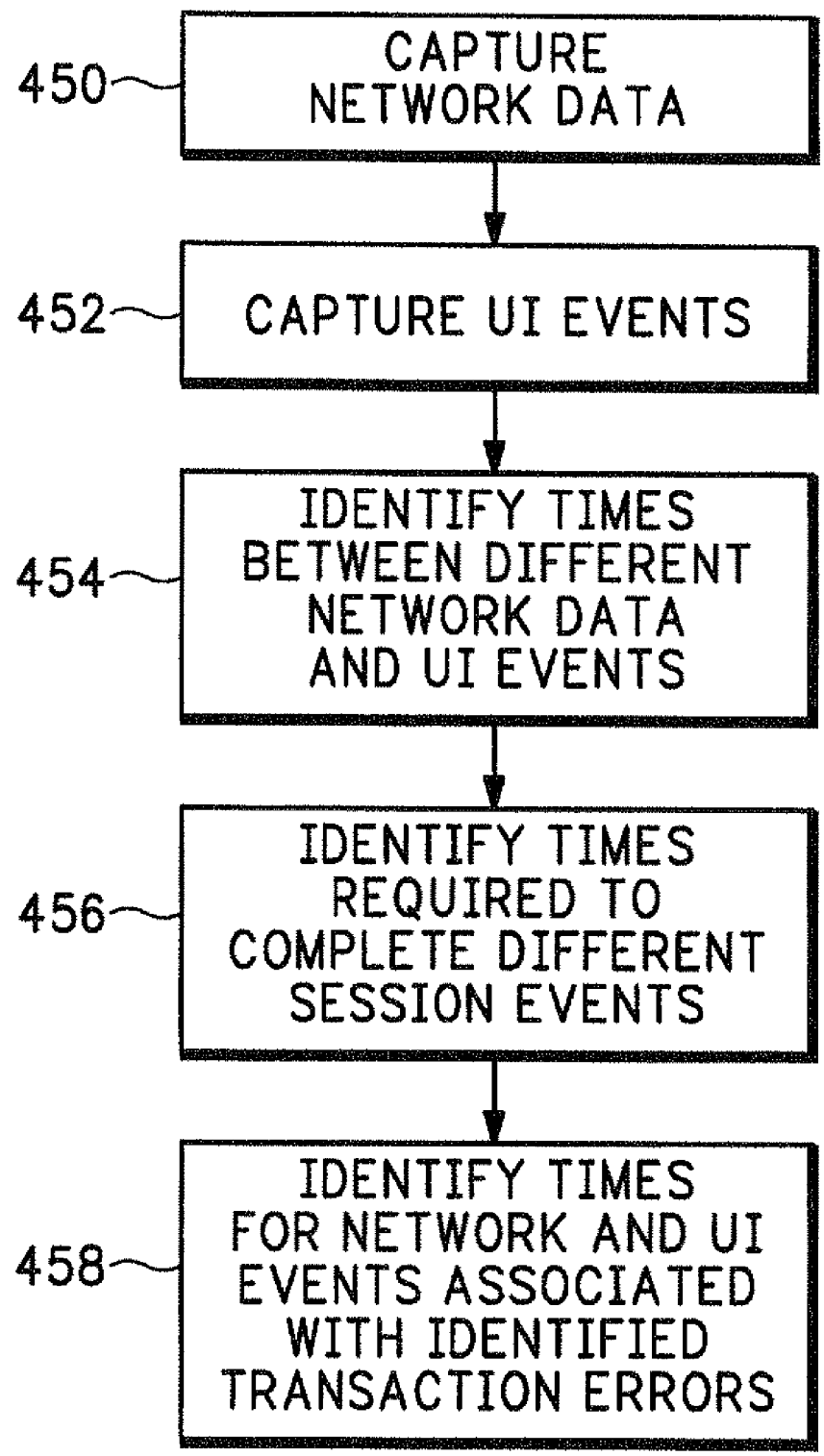

FIG. 13 describes in further detail the time based analytics. The network data is captured in operation 450 and the UI events are captured in operation 452. In operation 454, the session analyzer 52 in FIG. 1 can then identify times between different network data and UI events.

In operation 456, the session analyzer 52 can also, or alternatively, identify the time required to complete different session events. For example, instead of, or in addition to, determining the time between different network data and UI events, the session analyzer 52 may determine an amount of time required to select an item for purchase, the amount of time required to complete the entire network session, or the amount of time required to complete different activities during the same network session. This can be done by identifying the time stamp value for a first session operation and then comparing this with the time stamp value for a final session operation.

In yet another analytic, the session analyzer 52 in operation 458 may identify the time stamp values for captured network data and UI events associated with identified transaction errors. For example, the time stamp values may be identified for a UI event or network data immediately preceding or following an identified error message. Alternatively, the session analyzer 52 can use the time stamp values to determine how long it takes a user to resolve an identified error message and complete the online transaction.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method, comprising:
   capturing network data for a network session at a network location, the network data including web page data transmitted over a network between a web server and a user device;
   separately capturing user interface events associated with the network session at the user device, the user interface events including user inputs for interacting with the web page data; and
   replaying the network session by synchronizing rendering of at least some of the web page data with replay of at least some of the user interface events in substantially a same order as previously occurring during the network session, wherein the user interface events are captured and replayed with the web page data to recreate and simulate events in the network session that are not reproducible from the network data.

2. The method of claim 1, further comprising:
   monitoring and capturing the network data with a first computing device at the network location;
   sending the network data from the first computing device to a session archive;
   separately monitoring and capturing the user interface events with the user device; and
   sending the user interface events from the user device to the session archive.

3. The method of claim 1, wherein at least some of the user interface events are never transferred over the network during the network session.

4. The method of claim 1, further comprising:
   identifying time stamps assigned to the user interface events:
   identifying a time difference between a first one of the time stamps assigned to a first one of the user interface events and a second one of the time stamps assigned to a second one of the user interface events; and
   identifying problems previously occurring in the network session based on the time difference.

5. The method of claim 1, further comprising:
   identifying a network session event during the replaying of the network session;
   identifying a first time value associated with the network session event;
   identifying a second time value for one of the user interface events occurring after the network session event; and
   determine an amount of time for a user to complete an activity during the network session based on the first time value and the second time value.

6. The method according to claim 1 further comprising:
   receiving a request to replay a time window or a portion or a stage of the network session while replaying the network session; and
   synchronizing replay of the user interface events with the web page data to recreate and display only the time window or the portion or the stage of the network session.

7. The method of claim 1, further comprising:
   identifying changes in Document Object Models (DOM) events produced while replaying the network session;
   identifying states of the replayed network session based on the changes in the DOM events; and
   conducting analytics on the replayed network session based on the states of the replayed network session.

8. An apparatus, comprising:
a processing device configured to:
receive network data for a web session, wherein at least some of the network data comprises web pages transferred over a network between a server and a client during the web session;
receive input events for the web session, wherein at least some of the input events are captured at a client location and interact with the web pages during the web session; and
virtually recreate a re-rendering of the web session, wherein the input events are captured and replayed with the network data to recreate and simulate events previously occurring in the web session that would be missing by replaying only the network data.

9. The apparatus of claim 8, wherein the processing device is further configured to:
identify a first time stamp assigned to the network data or input events, wherein the first time stamp is associated with a beginning state of the web session;
identifying a first time value associate with the first time stamp;
identify a second time stamp assigned to the network data or input events, wherein the second time stamp is associated with an ending state of the web session;
identifying a second time value associate with the second time stamp; and
identifying an amount of time required to complete the web session based on the first time value and the second time value.

10. The apparatus of claim 8, wherein the processing device is further configured to:
identify a first time stamp assigned to the network data, wherein the first time stamp is associated with a transaction in the web session;
identify a first time value associated with the first time stamp;
identify a second time stamp assigned to one of the input events occurring after the first time value;
identify a second time value associated with the second time stamp; and
identifying an amount of time required to complete the transaction in the web session based on the first time value and the second time value.

11. The apparatus of claim 8, wherein the processing device is further configured to:
receive a request identifying a time window for replaying the web session; and
replay the input events with the network data to virtually recreate a re-rendering of the web session only for the time window.

12. The monitoring system of claim 11, wherein:
time stamps are added to the network data and the input events during the web session; and
the processing device is configured to use the time stamps to identify the time window.

13. The apparatus of claim 8, wherein the processing device is further configured to:
monitor the re-rendering of the web session;
search for events during the re-rendering of the web session; and
extract web session parameters from the re-rendering of the web session associated with the events.

14. The apparatus of claim 13, wherein the events comprise a Uniform Resource Locator (URL).

15. The apparatus of claim 8, wherein:
the network data is received from a first processing device configured to capture the network data at a first network location during the web session as the network data is being transferred between the server and the client; and
the input events are received from a second processing device configured to capture the input events generated at the client when interacting with the network data during the web session.

16. A network monitoring system, comprising:
a first computing device configured to capture network data for a web session, wherein the network data is sent over a network from a web server to a client during the web session;
a second computing device configured to capture user interface events for the web session at the client, wherein at least some of the user interface events interact with the network data; and
a third computing device configured to replay the web session by synchronizing replay of at least some of the user interface events with replay of at least some of the network data, wherein the user interface events are captured and replayed with the network data to recreate events in the web session that are not reproducible only with the network data.

17. The network monitoring system of claim 16 wherein the third computing device is further configured to replay and display a selectable time window or a selectable portion or stage of the network data and user interface events.

18. The network monitoring system of claim 16 wherein the third computing device is further configured to synchronize replay of the network data and the user interface events for substantially the entire web session.

19. The network monitoring system of claim 16 wherein the third computing device is further configured to:
receive a request to scan the replayed web session for a time period;
scan the replayed web session for messages or events during the time period; and
archive the messages or events.

20. A method, comprising:
receiving network data captured while being transmitted over a network during a network session;
receiving user inputs captured during the network session, wherein the user inputs are entered in response web pages in the network data displayed during the network session; and
replaying the network session by synchronizing rendering of the web pages in the network data with the replaying of the user inputs, wherein the user inputs are captured and replayed with the network data to recreate events from the network session that are not reproducible with just the network data.

21. The method of claim 20, further comprising:
receiving a request to replay a time window or a portion or stage of the network session; and
displaying only the web pages from the network data and the user inputs for the time window or for the portion or stage of the network session identified in the request.

22. The method of claim 20, wherein:
the network session is conducted between a web application operating on a web server and a client operating on a user device;
the user inputs are captured on the user device; and
the network data is captured either on the web server of on an intermediary server between the web server and the user device.

23. The method of claim 20, further comprising:

identifying a first time stamp value assigned to the network data during the network session;

identifying a second time stamp value assigned to the user inputs during the network session; and identifying a time difference between the first time stamp value and the second time stamp value; and identifying an event during the replaying of the network session associated with the time difference.

* * * * *

UNITED STATES PATENT AND TRADEMARK OFFICE
CERTIFICATE OF CORRECTION

PATENT NO.       : 8,335,848 B2                                        Page 1 of 1
APPLICATION NO.  : 13/337905
DATED            : December 18, 2012
INVENTOR(S)      : Robert Wenig et al.

It is certified that error appears in the above-identified patent and that said Letters Patent is hereby corrected as shown below:

Item (56) References Cited:

| | |
|---|---|
| Title Page 3, column 2, line 8 (Other Publications): | After "ACM," insert --New York, NY, USA, 22 May 2006 (2006-05-22), pages 203-212, XP002519605, DOI:--, therefor. |
| Title Page 3, column 2, line 12 (Other Publications): | Delete "corn" and insert --com--, therefor. |
| Title Page 3, column 2, line 12 (Other Publications): | Delete "articies" and insert --articles--, therefor. |

In the Claims:

Column 16, line 65 (Claim 22):   Delete "of on" and insert --of--, therefor.

Signed and Sealed this
Twenty-second Day of April, 2014

Michelle K. Lee
*Deputy Director of the United States Patent and Trademark Office*